(12) United States Patent
Li et al.

(10) Patent No.: US 12,549,536 B2
(45) Date of Patent: Feb. 10, 2026

(54) BYPASSING A USER PASSCODE WHEN ACCESSING A GATEWAY OF A VIRTUAL DISKTOP INFRASTRUCTURE SYSTEM

(71) Applicant: Omnissa, LLC, Mountain View, CA (US)

(72) Inventors: Hongsheng Li, Beijing (CN); Feng Yan, Beijing (CN); Qiang Ye, Beijing (CN); Qi Sun, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 715 days.

(21) Appl. No.: 17/867,366

(22) Filed: Jul. 18, 2022

(65) Prior Publication Data

US 2023/0388289 A1  Nov. 30, 2023

(30) Foreign Application Priority Data

May 30, 2022 (WO) ................ PCT/CN2022/095915

(51) Int. Cl.
*H04L 9/40* (2022.01)
(52) U.S. Cl.
CPC ........ *H04L 63/0823* (2013.01); *H04L 63/083* (2013.01)
(58) Field of Classification Search
CPC ... H04L 9/0852; H04L 9/0858; H04L 9/0855; H04L 63/061; H04L 9/083; H04L 9/0822; H04L 9/3226; H04L 9/0891; H04L 9/14; H04L 9/0827; H04L 2209/24; H04L 9/08; H04L 9/0819; H04L 9/088; H04L 9/0869; H04L 63/0823; H04W 12/041; H04W 12/0431; H04W 12/0433; H04W 12/04; H04W 12/61; H04W 12/63; H04W 12/71; G06F 21/31; G06F 21/44; G06F 7/588; G06F 21/72; G06F 21/86
USPC ............ 726/6, 2, 21, 36; 713/150, 163, 181; 380/255, 264, 276
See application file for complete search history.

(56) References Cited

U.S. PATENT DOCUMENTS

| | | | | |
|---|---|---|---|---|
| 5,764,765 A | * | 6/1998 | Phoenix ................ | H04L 9/0858 380/256 |
| 6,748,083 B2 | * | 6/2004 | Hughes ................ | H04L 9/0858 380/278 |
| 7,437,081 B2 | * | 10/2008 | Mitchell ............... | H04B 10/70 398/154 |
| 8,855,316 B2 | * | 10/2014 | Wiseman .............. | H04L 9/0855 380/278 |
| 9,960,465 B2 | * | 5/2018 | Dudley ............... | H01M 50/204 |
| 10,057,058 B2 | * | 8/2018 | Murakami ........... | H04L 9/0858 |
| 11,431,510 B1 | * | 8/2022 | Stapleton ............. | H04L 9/3268 |
| 2005/0138352 A1 | * | 6/2005 | Gauvreau ............ | H04L 9/3247 713/153 |

(Continued)

*Primary Examiner* — Sharif E Ullah
(74) *Attorney, Agent, or Firm* — Kim & Stewart LLP (57) ABSTRACT

A method enables a user to bypass a pass code, such as personal identification number (PIN), when performing an authentication process between a client device and a gateway/broker of a virtual desktop infrastructure (VDI) provided by a virtualized computing environment. A customized operating system (OS) of the client device includes pre-installed certificates and keys that are used in the authentication process and which are protected by the PIN. Through a public interface, a client device may perform the authentication process without requiring the user to manually enter the PIN.

15 Claims, 5 Drawing Sheets

(56) References Cited

U.S. PATENT DOCUMENTS

| | | | | |
|---|---|---|---|---|
| 2005/0221759 A1* | 10/2005 | Spadafora | | G08G 1/093 455/39 |
| 2007/0065154 A1* | 3/2007 | Luo | | H04J 14/0282 398/141 |
| 2007/0076884 A1* | 4/2007 | Wellbrock | | H04L 9/0855 380/263 |
| 2007/0195774 A1* | 8/2007 | Sherman | | H04L 69/16 370/392 |
| 2011/0206204 A1* | 8/2011 | Sychev | | H04J 14/06 380/256 |
| 2011/0213979 A1* | 9/2011 | Wiseman | | H04L 9/0844 713/171 |
| 2012/0089666 A1* | 4/2012 | Goswami | | G06Q 10/103 709/203 |
| 2014/0010234 A1* | 1/2014 | Patel | | H04L 45/74 370/392 |
| 2014/0068765 A1* | 3/2014 | Choi | | H04L 63/1416 726/23 |
| 2014/0133652 A1* | 5/2014 | Oshida | | H04L 9/0897 380/255 |
| 2016/0155327 A1* | 6/2016 | Schlienz | | G08G 1/096791 340/907 |
| 2016/0241396 A1* | 8/2016 | Fu | | H04L 9/0836 |
| 2016/0359626 A1* | 12/2016 | Fu | | H04L 9/0858 |
| 2016/0366094 A1* | 12/2016 | Mason | | H04L 61/5038 |
| 2017/0214525 A1* | 7/2017 | Zhao | | H04W 12/0431 |
| 2017/0230173 A1* | 8/2017 | Choi | | H04L 9/0861 |
| 2017/0338952 A1* | 11/2017 | Hong | | H04L 9/083 |
| 2018/0041494 A1* | 2/2018 | Quintero Cantero | | H04W 12/041 |
| 2018/0060572 A1* | 3/2018 | Singleton | | G06F 21/53 |
| 2018/0176091 A1* | 6/2018 | Yoon | | H04L 5/1446 |
| 2019/0036821 A1* | 1/2019 | Levy | | G06F 12/0868 |
| 2019/0260581 A1* | 8/2019 | Su | | H04L 9/08 |
| 2019/0349392 A1* | 11/2019 | Wetterwald | | H04L 43/0852 |
| 2020/0084222 A1* | 3/2020 | William | | H04L 63/12 |
| 2022/0360434 A1* | 11/2022 | Choi | | H04L 63/061 |
| 2023/0236902 A1* | 7/2023 | Zhao | | G06F 9/5044 718/105 |
| 2023/0388289 A1* | 11/2023 | Li | | H04L 63/0823 |

* cited by examiner

BYPASSING A USER PASSCODE WHEN ACCESSING A GATEWAY OF A VIRTUAL DISKTOP INFRASTRUCTURE SYSTEM

CROSS-REFERENCE TO RELATED APPLICATION

The present application claims the benefit of Patent Cooperation Treaty (PCT) Application No. PCT/CN2022/095915, filed May 30, 2022, which is incorporated herein by reference.

BACKGROUND

Unless otherwise indicated herein, the approaches described in this section are not admitted to be prior art by inclusion in this section.

Virtualization allows the abstraction and pooling of hardware resources to support virtual machines in a software-defined networking (SDN) environment, such as a software-defined data center (SDDC). For example, through server virtualization, virtualized computing instances such as virtual machines (VMs) running different operating systems (OSs) may be supported by the same physical machine (e.g., referred to as a host). Each virtual machine is generally provisioned with virtual resources to run an operating system and applications. The virtual resources in a virtualized computing environment may include central processing unit (CPU) resources, memory resources, storage resources, network resources, etc.

One example use of a virtualized computing environment is for a virtual desktop infrastructure (VDI) implementation, which is a type of desktop virtualization that allows a remote desktop to run on VMs that are provided by a hypervisor on a host. A user/client uses the operating system (OS) and applications (which reside and execute at the VM) via an endpoint device (client device) of the user, just as if the OS/applications were actually running locally on the endpoint device, when in reality the OS/applications are running on the remote desktop.

However, there are challenges when using VDI implementations in connection with customized OSs that run on the client devices. For example, a passcode such as a personal identification number (PIN) is sometimes used to open or unlock a virtual desktop session. However, PINS can be difficult to implement/use some situations.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses drawbacks associated with client devices that are used to access and use the functionality of a virtual desktop infrastructure (VDI) provided by a virtualized computing environment. For example, the VDI can provide a remote desktop that users of the client devices can access/use.

In order for the client devices to open a session to use a remote desktop, some VDI's implement an authentication process involving certificates and keys. For example, the VDI may include a gateway or broker that controls access to the remote desktops. To establish a session and as part of the authentication process, the gateway/broker requests the client device to provide a certificate, and then requests the client device to sign a cipher string (using a private key) in order to validate/verify the certificate. A user of the client device may typically need to manually enter a passcode, such as a personal identification number (PIN), in order to access a private keystore for the private key (e.g., to unlock a cryptography session handler) for performing cryptographic operations including signing the cipher string. Upon successful completion of the authentication process, the gateway/broker recognizes the client device as being authorized to conduct a session using the remote desktop.

With some implementations of client devices, the operating systems (OSs) running on such client devices may be in a customized form. For instance, the customized OS of the client device may include or be used in conjunction with pre-installed certificates and keys residing in the client device. The certificates and/or keys are then protected or otherwise kept private using a PIN. A system administrator would know the PIN to unlock a certificate keystore or other private storage that holds the certificates and keys. However, the end user itself of the client device would not know the PIN—as a result, the end user would be unable to open a remote desktop session with the gateway/broker of the VDI, as the PIN is needed in order to access the private key for the authentication process.

The embodiments disclosed herein address the above and other drawbacks associated with client devices having customized OSs that operate in conjunction with pre-installed certificates and keys that are protected by PINs that are not known to the users of the client devices. The embodiments of the techniques disclosed herein enable the users to bypass the PIN during the authentication process/workflow.

Computing Environment

Figure 1:
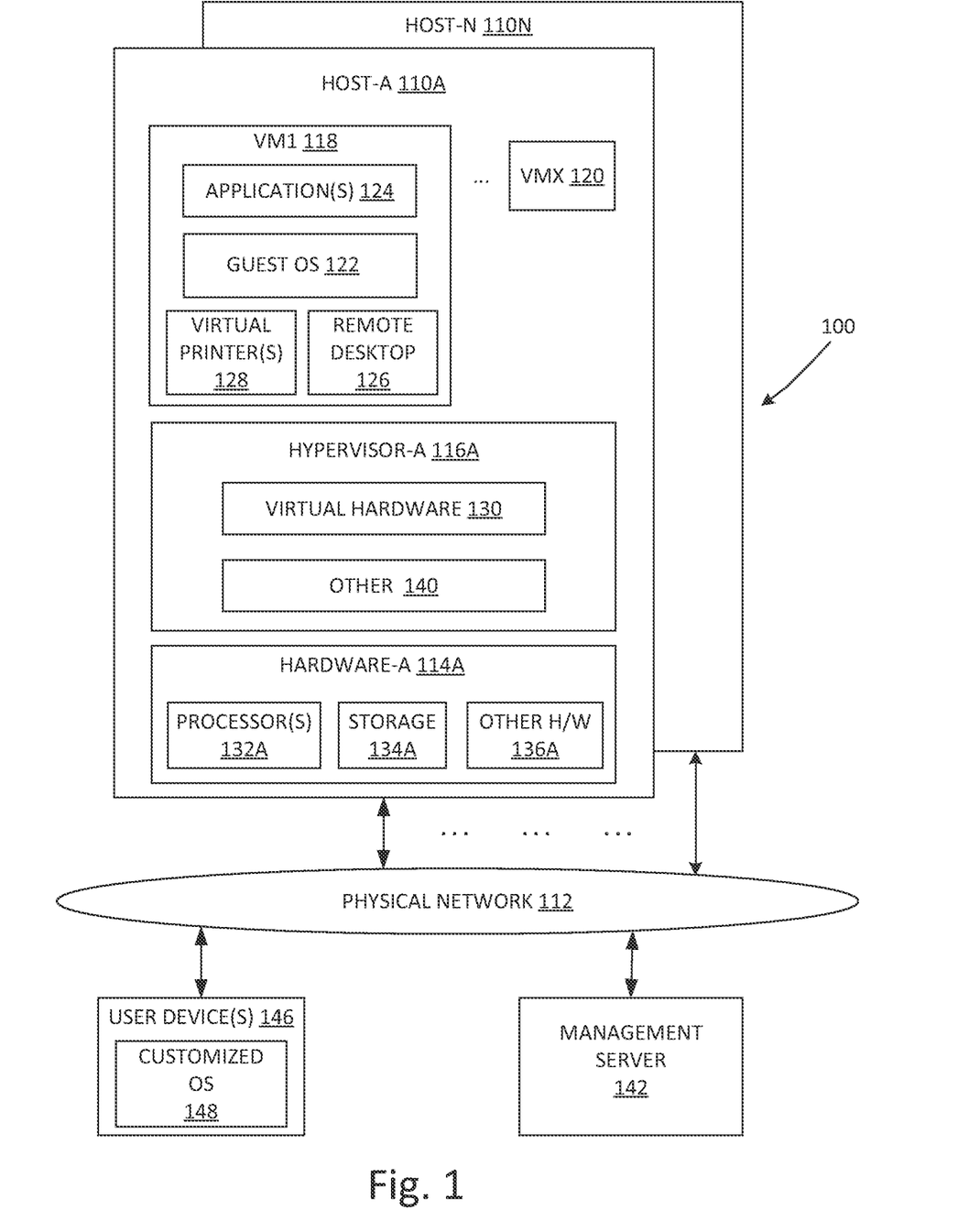
FIG. 1 is a schematic diagram illustrating an example virtualized computing environment that can implement a virtual desktop infrastructure (VDI)

To further explain the details pertaining to bypassing a PIN in connection with an authentication process to establish a remote desktop session, reference is made herein to FIG. 1, which is a schematic diagram illustrating an example virtualized computing environment 100 that can implement a virtual desktop infrastructure (VDI). Depending on the desired implementation, virtualized computing environment 100 may include additional and/or alternative components than that shown in FIG. 1.

In the example in FIG. 1, the virtualized computing environment 100 includes multiple hosts, such as host-A 110A . . . host-N 110N that may be inter-connected via a physical network 112, such as represented in FIG. 1 by interconnecting arrows between the physical network 112 and host-A 110A . . . host-N 110N. Examples of the physical network 112 can include a wired network, a wireless network, the Internet, or other network types and also combinations of different networks and network types. For simplicity of explanation, the various components and features of the hosts will be described hereinafter in the context of the host-A 110A. Each of the other host-N 110N can include substantially similar elements and features.

The host-A 110A includes suitable hardware 114A and virtualization software (e.g., a hypervisor-A 116A) to support various virtual machines (VMs). For example, the host-A 110A supports VM1 118 . . . VMX 120, wherein X (as well as N) is an integer greater than or equal to 1. In practice, the virtualized computing environment 100 may include any number of hosts (also known as computing devices, host computers, host devices, physical servers, server systems, physical machines, etc.), wherein each host may be supporting tens or hundreds of virtual machines. For the sake of simplicity, the details of only the single VM1 118 are shown and described herein.

VM1 118 may be an agent-side VM that includes a guest operating system (OS) 122 and one or more guest applications 124 (and their corresponding processes) that run on top of the guest OS 122. The guest applications 124 may include remote desktop applications, for example. Using the guest OS 122 and/or other resources of VM1 118 and the host-A 110A, VM1 118 may generate a remote desktop 126 (virtual desktop) that is operated by and accessible to one or more client-side user device(s) 146 (e.g., a client device or a local/endpoint device) via the physical network 112. One or more virtual printers 128 also may be instantiated in VM1 118 and/or elsewhere in the host-A 110A, and may correspond to one or more physical printers (not shown) at the user device 146. VM1 118 may include other elements, such as code and related data (including data structures), engines, etc.

The user device 146 may include a customized operating system 148 and other components (to support the use of the user device 146 to access and operate the remote desktop 126 and other elements of VM1 118). For example, the OS 148 may include or operate in conjunction with pre-installed certificates and keys that are stored in a private/protected storage residing at the user device 146.

According to various embodiments, VM1 118 may operate as or have installed therein an agent that provides the remote desktop 126 (and other remote desktop features and functionality) to the user device 146. For instance, the agent may be a Horizon agent (provided by VMware, Inc. of Palo Alto, California as part of the Horizon product line) that can cooperate with client software (e.g., a Horizon client, installed at the user device 146) to establish and maintain a remote desktop connection/session between VM1 118 and the user device 146 for purposes of enabling the user to use the remote desktop 126. One or more connection servers (such as a gateway and/or broker) can broker or otherwise manage communications between the agent (e.g., a Horizon agent) and the client software (e.g., a Horizon client) over a VDI connection 208 (shown in FIG. 2) provided by the physical network 112. A management server 142 and/or other server(s)/device(s) in the virtualized computing environment 100 can operate as the gateway/broker in some embodiments.

The hypervisor-A 116A may be a software layer or component that supports the execution of multiple virtualized computing instances. The hypervisor-A 116A may run on top of a host operating system (not shown) of the host-A 110A or may run directly on hardware 114A. The hypervisor 116A maintains a mapping between underlying hardware 114A and virtual resources (depicted as virtual hardware 130) allocated to VM1 118 and the other VMs. The hypervisor-A 116A may include other elements (shown generally at 140), including tools to provide resources for and to otherwise support the operation of the VMs.

Hardware 114A in turn includes suitable physical components, such as central processing unit(s) (CPU(s)) or processor(s) 132A; storage device(s) 134A; and other hardware 136A such as physical network interface controllers (NICs), storage disk(s) accessible via storage controller(s), etc. Virtual resources (e.g., the virtual hardware 130) are allocated to each virtual machine to support a guest operating system (OS) and application(s) in the virtual machine, such as the guest OS 122 and the application(s) 124 (e.g., a word processing application, accounting software, a browser, etc.) in VM1 118. Corresponding to the hardware 114A, the virtual hardware 130 may include a virtual CPU, a virtual memory (including agent-side caches used for print jobs for the virtual printers 128), a virtual disk, a virtual network interface controller (VNIC), etc.

The management server 142 of one embodiment can take the form of a physical computer with functionality to manage or otherwise control the operation of host-A 110A . . . host-N 110N. In some embodiments, the functionality of the management server 142 can be implemented in a virtual appliance, for example in the form of a single-purpose VM that may be run on one of the hosts in a cluster or on a host that is not in the cluster.

The management server 142 may be communicatively coupled to host-A 110A . . . host-N 110N (and hence communicatively coupled to the virtual machines, hypervisors, hardware, etc.) via the physical network 112. In some embodiments, the functionality of the management server 142 may be implemented in any of host-A 110A . . . host-N 110N, instead of being provided as a separate standalone device such as depicted in FIG. 1.

Depending on various implementations, one or more of the physical network 112, the management server 142, and the user device(s) 146 can comprise parts of the virtualized computing environment 100, or one or more of these elements can be external to the virtualized computing environment 100 and configured to be communicatively coupled to the virtualized computing environment 100.

Figure 2:
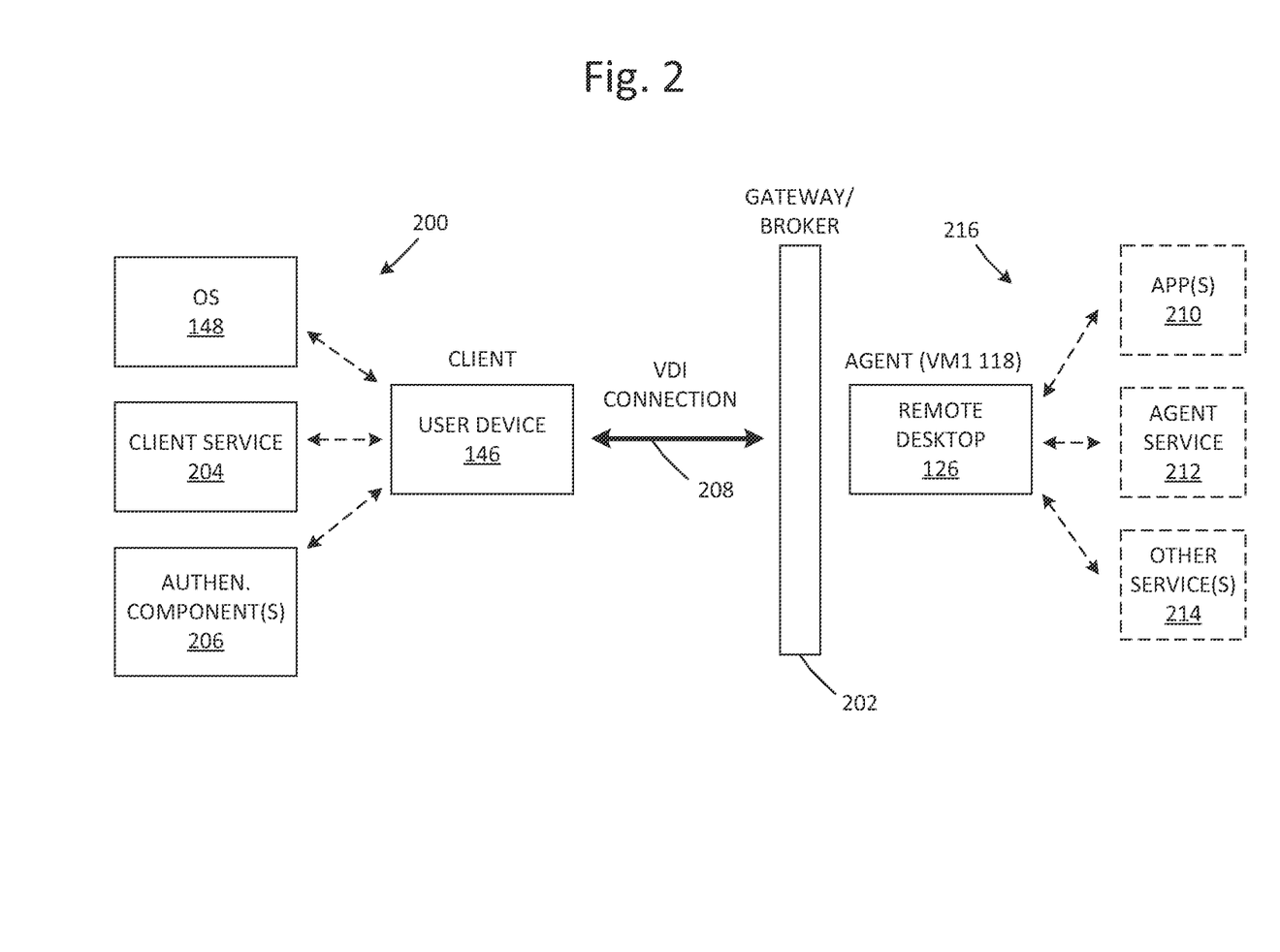
FIG. 2 is a schematic diagram illustrating some example client-side and agent-side components for a VDI in the virtualized computing environment of FIG. 1.

FIG. 2 is a schematic diagram illustrating some example client-side and agent-side components for a VDI in the virtualized computing environment 100 of FIG. 1. More specifically, FIG. 2 shows client-side components 200 (e.g., components running on, residing at, or operatively coupled to the user device 146), and agent-side components 216

(e.g., the VM1 118 that provides the remote desktop 126 and which runs on a host, and other agent-side devices/components).

For the client-side components 200, the user device 146 may have (among other things) the customized OS 148 installed in it. One or more local applications or some other software at the user device 146 may be in the form of a client service 204 (e.g., a Horizon client or other remote desktop client software or code). The user device 146 may further include one or more authentication components 206 used for authenticating and establishing a remote desktop session, over the VDI connection 208, with the agent-side components 216, in a manner that will be described later below.

For the agent-side components 216, one or more physical and/or virtual computing devices (such as a server) may provide the functionality of a gateway/broker 202. Among other things, the gateway/broker 202 may be configured to perform an authentication process with the user device 146, establish and maintain (in response to successful completion of the authentication process) a remote desktop session between the user device 146 and VM1 118 running the remote desktop 126, distribute sessions (e.g., load balance) amongst VMs, and other brokering/management operations.

The remote desktop 126 may provide applications 210 installed/running thereon (e.g., the applications 124 of FIG. 1). VM1 118 that provides the remote desktop 126 may also have installed therein an agent service 212 (e.g., a Horizon agent or other remote desktop agent software or code) and other code generally depicted in FIG. 2 as other services 214.

Authentication Workflow

Described next herein are examples of workflows (and related components) for performing an authentication process to establish a remote desktop session between a user device and a VDI provided by a virtualized computing environment. These workflows demonstrate example techniques that are based on the user's manual entry of a PIN, versus techniques that bypass the PIN entry by the user.

Figure 3:
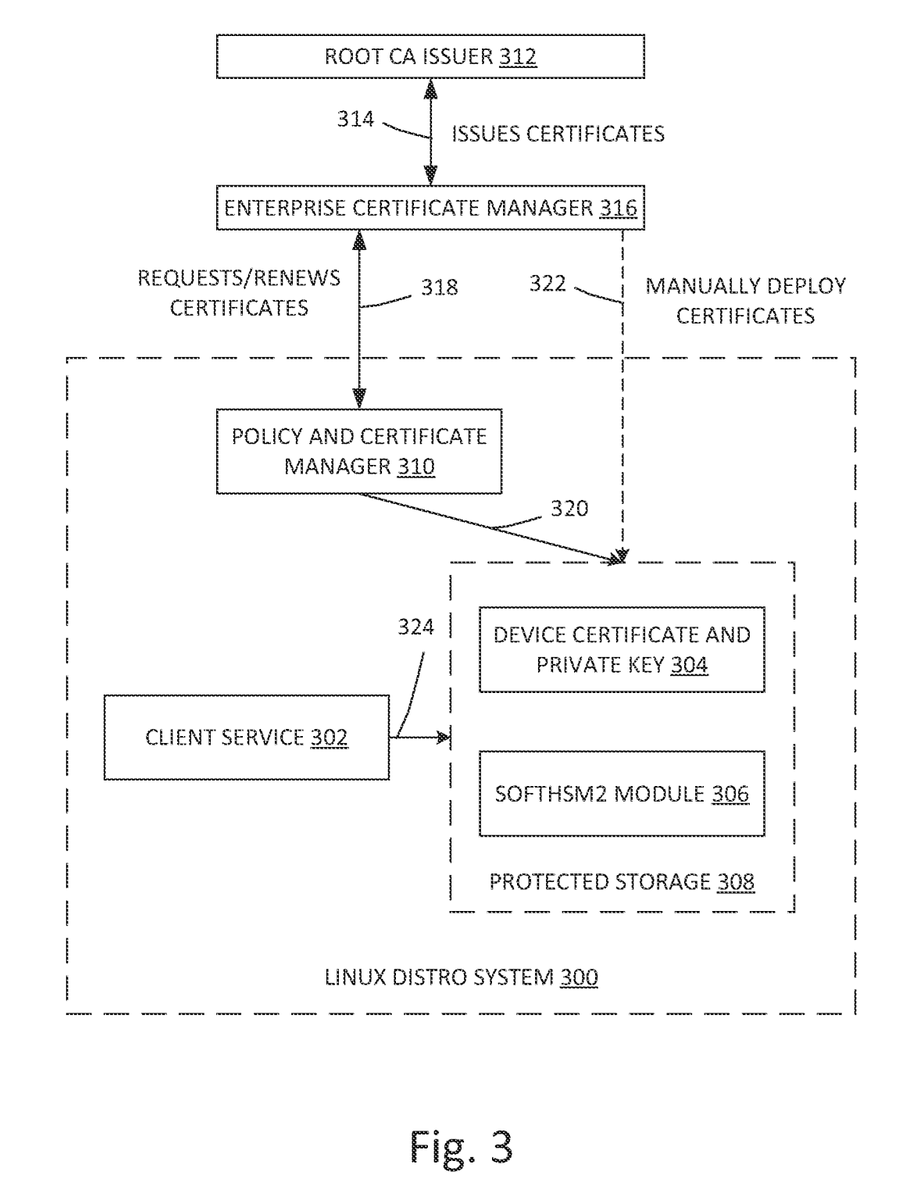
FIG. 3 is schematic diagram illustrating some example components that may be provided in an implementation wherein an end user provides a PIN as part of an authentication process to access the functionality of a VDI.

Referring first to FIG. 3, FIG. 3 is schematic diagram illustrating some example components that may be provided in an implementation wherein an end user provides a PIN as part of an authentication process to access the functionality of a VDI. An operating system package (e.g., installed at a user/client device) is depicted in FIG. 3 as a Linux distribution (distro) system 300, by way of example—other types of OS packages may be provided in other implementations. The distro system 300 may be customized in that a client service 302 (e.g., the client service 204 of FIG. 2, such as a Horizon client or other native client software to support the functionality of a remote desktop) is provided along with a pre-installed device certificate and private key 304.

A software implementation of a hardware security module (HSM), such as a SoftHSM2 module 306, resides in a protected storage 308 at the distro system 300 along with the certificate and private key 304. Among other things, the SoftHSM2 module 306 stores/maintains the certificate and private key 304 in the protected storage 308, performs signing and other cryptographic-related operations using a cryptographic protocol, such as public key cryptography standard (PKCS) #11, etc. The distro system 300 may further include a policy and certificate manager 310.

In operation, a root certificate authority (CA) issuer 312 issues (shown at 314) certificates to an enterprise certificate manager 316 or other entity. The policy and certificate manager 310 may then request/renew (shown at 318) certificates from the enterprise certificate manager 316, and deploy (shown at 320) the certificates for storage in the protected storage 308. Alternatively or additionally, a system administrator may use tools available from the SoftHSM2 module 306 to manually deploy (shown at 322) certificates from the enterprise certificate manager 316 into the protected storage 308.

With respect to an authentication process, the client service 302 may provide a device certificate authentication feature, which enables the user of the client device to use the certificates/keys (e.g., the pre-installed certificate and private key 304) to authenticate with a gateway/broker (e.g., the gateway/broker 202 shown in FIG. 2). For example, by using the pre-installed certificate and private key 304 in the protected storage 306, the SoftHSM2 module 308 may establish a transport layer security (TLS) connection between the client service 302 and the gateway/broker.

During the authentication process using the components shown in FIG. 3, the TLS workflow requires the user to sign a cipher string that comes from the server side (e.g., the gateway/broker) for validation of a certificate, and then return the signed cipher string back to the gateway/broker. For example, the client service 302 uses the PKCS #11 protocol to access the certificate and private key 304 saved in/by the SoftHSM2 module 306 at the protected storage 308, and then performs authentication with the gateway/broker using the certificate. Generally and as previously explained above, the user may be required to manually input (shown at 324) a user PIN to access the protected storage 308. Inputting the PIN unlocks a cryptography session handler that uses the private key 304 to do encryption work (e.g., signing the cipher string provided by the gateway/broker, and performing other cryptographic operations).

The foregoing authentication workflow may be workable for users that can input PINs and that maintain PINs for themselves. However and as also previously explained above, some implementations do not provide the users with access to the PINs and the users do not know the PINs, and so such users are unable to access the certificate and private key 304 in order to successfully complete the authentication process and unlock a remote desktop session.

Figure 4:
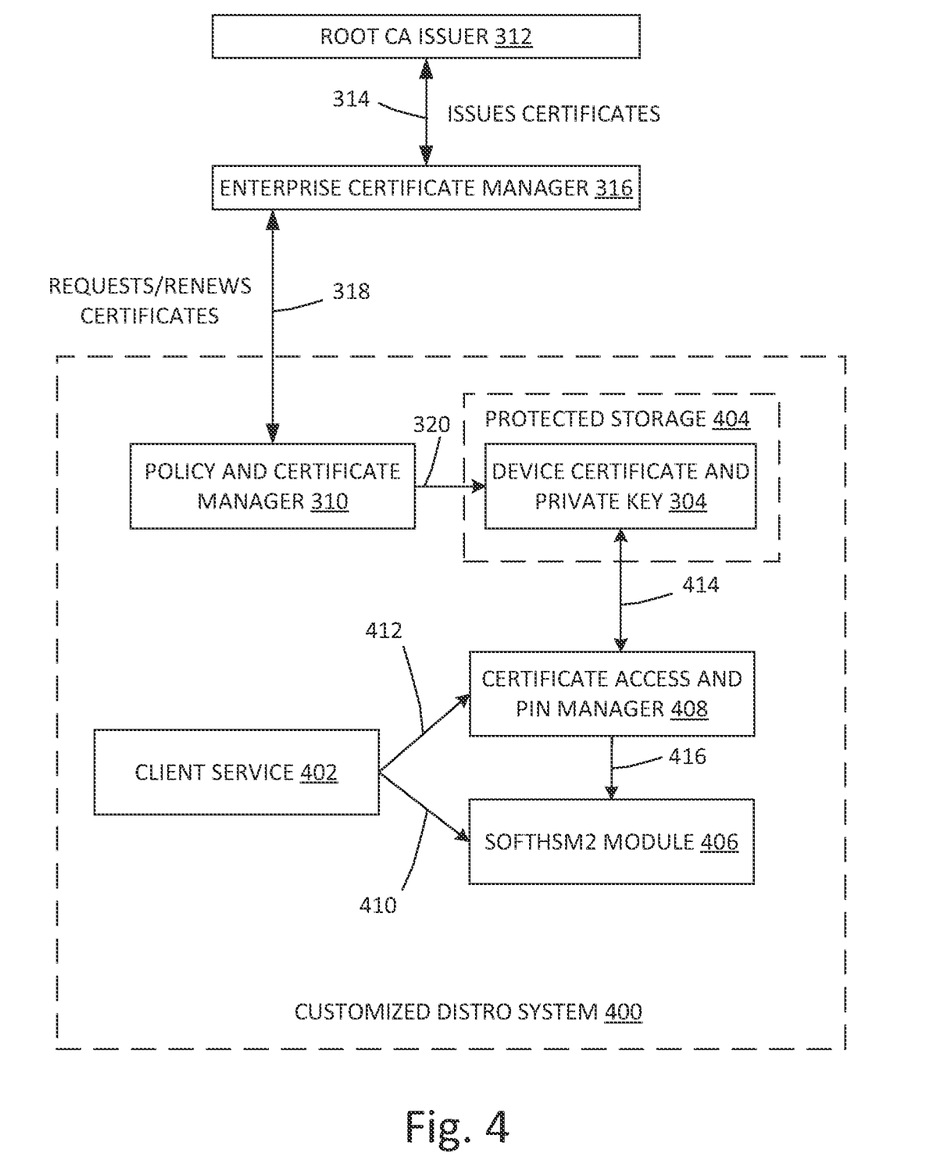
FIG. 4 is a schematic diagram illustrating some example components that may be provided to support a client device's use of a certificate and key to access the VDI in the virtualized computing environment of FIG. 1.

Referring next to FIG. 4, FIG. 4 is a schematic diagram illustrating some example components that may be provided to support a client device's use of a certificate and key to access to the VDI in the virtualized computing environment of FIG. 1, without requiring the user to manually enter a PIN (e.g., bypasses manual PIN entry by the user). Some components in FIG. 4, which are similar/same to corresponding components in FIG. 3 and which are identified using the same reference labels/numbers, perform the same/similar operations (unless otherwise described below), and so the description of such components is not repeated herein for FIG. 4, for the sake of brevity.

In FIG. 4, a customized distro system 400 (e.g., a customized OS package) includes a client service 402 (e.g., the client service 204 of FIG. 2, such as a Horizon client or other native client software to support the functionality of a remote desktop) along with the pre-installed device certificate and private key 304, which has been deployed by the policy and certificate manager 310 from the root CA issuer 312 (and enterprise certificate manager 316) into a protected storage 404. A SoftHSM2 module 406 is configured to store/maintain the certificate and private key 304 in the protected storage 404 and to perform other cryptography-related operations. One or more of the policy and certificate manager 310, protected storage 404 and its contents, and the SoftHSM2 module 406 may comprise the authentication components 206 shown in FIG. 2.

According to various embodiments, the distro system 400 may further include a certificate access and PIN manager 408 as one of the authentication components 206. The certificate access and PIN manager 408 of such embodiments provides a public method, application program interface (API), or other tool/procedure (all generally referred to herein as an interface) to provide the client service 402 with access and visibility to the certificate and private key 304 in the protected storage 404, so as to enable the client service 402 to perform and complete an authentication process without requiring the user to manually enter a PIN. Such interface may have a format of CK_RV UserLogin (CK_SESSION_HANDLE), for example, that instructs the certificate access and PIN manager 408 to unlock the SoftHSM2 module 406 and/or the protected storage 408 for access by the client service 402.

To perform the authentication process, the client service 402 uses the PKCS #11 protocol (or other suitable cryptography protocol) to access (shown at 410) the SoftHSM2 module 406 for the certificate and private key 304. To enable such access to the SoftHSM2 module 406 by the client service 402, the client service 402 uses the above-described interface (shown at 412) to contact the certificate access and PIN manager 408 to unlock the session.

For example, the certificate access and PIN manager 408 may obtain (shown at 414) the certificate and private key 304 from the private storage 404 and provide (shown at 416) the certificate and private key 304 to the SoftHSM2 module 406. When the client service 402 uses the interface to contact the certificate access and PIN manager 408 to unlock a session, the certificate access and PIN manager 408 unlocks the SoftHSM2 module 406 so as to enable access (at 410) by the client service 402 to the certificate and private key 304 of the SoftHSM2 module 406.

In one embodiment, the certificate access and PIN manager 408 may use the PIN (which is known by the OS and/or the system administrator, but unknown to the user) to perform the above unlocking of the SoftHSM2 module 406 and/or the protected storage 408. In other embodiments, other unlocking tool, code, etc. may be used by the certificate access and PIN manager 408 alternatively or additionally to the PIN. In this manner, the user need not know and need not manually enter the PIN in order to perform the unlocking—the certificate access and PIN manager 408 can perform the unlocking (in the background) in response to being contacted by the client device via the interface at 412.

Figure 5:
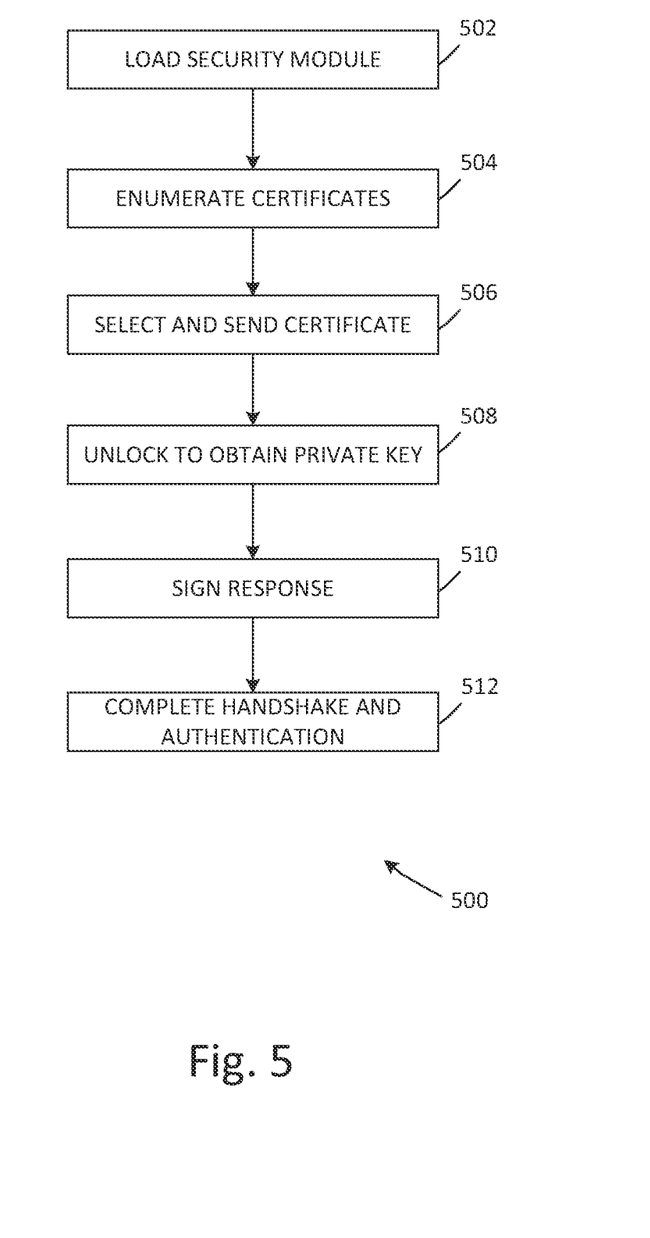
FIG. 5 is a flowchart of an example method to perform operations of an authentication procedure.

FIG. 5 is a flowchart of an example method 500 to perform the above-described operations of the authentication procedure, including a TLS two-way handshake between the gateway/broker 202 of FIG. 2 and the client service 402 of FIG. 4. In one embodiment, the operations of the method 500 and/or of any other method(s)/process(es) described herein may be performed in a pipelined sequential manner. In other embodiments, some operations may be performed out-of-order, in parallel, etc.

The method 500 may begin at a block 502 ("LOAD SECURITY MODULE"), wherein the client service 402 loads a security module, such as the SoftHSM2 module 406, into the OS or elsewhere in the user device 146. As previously explained above with respect to FIG. 4 (and in some respects, FIG. 3), the certificates and keys may be pre-installed in the SoftHSM2 module 406 and/or in the protected storage 404 as part of the customization of the OS or distro system 400, and protected with a PIN that is unknown to the user.

It is also noted that the gateway/broker 202 is configured with certificates for authentication, such as a X.509 certificate or other certificate standard. As such, in order for the user device 146 to conduct sessions with remote desktops via the gateway/broker 202, client service 402 at the user device 146 needs to provide a valid certificate to the gateway/broker 202 during the authentication process.

The block 502 may be followed by a block 504 ("ENUMERATE CERTIFICATES"), wherein before starting with the TLS handshake, the client service 402 enumerates (e.g., provides a listing on a display screen of the user device 146) all of the valid certificates for the gateway/broker 202. There may be a number of ways to enumerate such certificates.

For example, the client service 402 may obtain a list of certificates from the gateway/broker 402 or other source, and determine which of the certificates on the list are installed at the client device 146. To determine which certificates are installed at the client device 146, the client service 402 of some embodiments may use the above described interface to instruct the certificate access and PIN manager 408 to identify and provide a list of, and access to, the certificates stored in the private storage 404. In other embodiments, the certificates may not be PIN-protected in the protected storage 404 (and/or other storage) and so may be readily accessible by the client service 402 without necessarily having to use the interface to communicate with the certificate access and PIN manager 408 for access, while the private keys in the protected storage 408 are PIN-protected and therefore require the client service 402 to use the interface to communicate with the certificate access and PIN manager 408 for access to the private keys.

The block 504 may be followed by a block 506 ("SELECT AND SEND CERTIFICATE"), wherein the client service 402 selects (from amongst the enumerated certificates), a valid certificate for the gateway/broker 202. Then, as part of the TLS handshake, the client service 402 sends the certificate to the gateway/broker 202, such as in response to a request for the certificate from the gateway/broker 202.

The block 506 may be followed by a block 508 ("UNLOCK TO OBTAIN PRIVATE KEY"), wherein the client service 402 unlocks the session. To perform this unlocking and as previously described above, the client service 402 uses the interface to contact the certificate access and PIN manager 408, so as to instruct the certificate access and PIN manager 408 to grant access to the SoftHSM2 module 406 that maintains the private key. For example and in response to being contacted/instructed by the client service 402 via the interface, the certificate access and PIN manager 408 may use the PIN (in the background and without intervention by the user) to unlock the SoftHSM2 module 406 and its functionality (including a cryptography session handler). Then, after this unlocking is completed, the client service 402 is able to obtain/access the private key and able to perform other cryptographic operations using the SoftHSM2 module 406.

For example, the client service 402 may receive a request from the gateway/broker 202 to verify the certificate that was previously sent by the client service 402. This request may be in the form of a cipher string that the client service 402 needs to sign using the SoftHSM2 module 406 and the private key. At a block 510 ("SIGN RESPONSE), the client service 402 signs the cipher string using the private key and cryptography session handler, and sends the signed cipher string back to the gateway/broker 202 as a response.

The block 510 may be followed by a block 512 ("COMPLETE HANDSHAKE AND AUTHENTICATION"). At the block 512, the authentication process with the gateway/broker 202 is completed after the above-described two-way TLS handshake is finished successfully. Thereafter, the client service 402 is able to access any other authentication workflow and/or any other remote desktop workflow via the gateway/broker 202.

Therefore from the foregoing description of various embodiments, a customized OS (having pre-installed certificates and keys protected by a PIN) can be deployed by a system administrator or other entity in a user device, along with a native application (such as a client service) for rendering/operating a remote desktop on the user device. In such a user device, the user does not need to know the PIN, and authentication with a gateway/broker for the remote desktop can be performed successfully in the background background. All of the certificates and related rules may be controlled by the system administrator, and so the client service can be easily adopted to this type of customized OS.

The device certificate authentication of gateways/brokers for remote desktops may be extended to customized OS configurations, including customized OS for thin client devices. Further, the device authentication workflow can be done explicitly in the background, without requiring the user to know or manually enter a PIN, while the PIN itself can continue to be used by the OS to protect the private keys and/or certificates. Also, the PIN is protected by the OS and is not exposed to others outside of a system administrator.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIGS. 1-5. For example, computing devices capable of acting as agent-side devices or client-side user devices may be deployed in or otherwise operate in conjunction with the virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances (VCIs) may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system. Moreover, some embodiments may be implemented in other types of computing environments (which may not necessarily involve a remote desktop provided by a virtualized computing environment), wherein it would be beneficial to bypass a PIN or other passcode that is unknown to a user.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

The invention claimed is:

1. A method to perform an authentication process between a user device and a server for a virtual desktop infrastructure (VDI) provided by a virtualized computing environment, the method comprising:
   storing, on the user device, a certificate and a corresponding private key used to authenticate the user device to the server, wherein the certificate and private key are pre-installed in an operating system of the user device, and wherein at least one of the certificate or the private key is protected by a passcode, wherein the passcode comprises a personal identification number (PIN) that is unknown to a user of the user device;
   selecting, by a client service for the VDI, the certificate from amongst a list of certificates that are pre-installed in the user device and that are valid for the server;
   sending, by the client service, the certificate to the server in response to a request from the server for the certificate;

unlocking, by the client service, the private key using a public interface, wherein unlocking the private key using the public interface bypasses entry of the passcode by the user, and wherein unlocking includes:
  sending, by the client service via the public interface, an instruction to a certificate access and PIN manager to unlock the private key; and
  in response to the instruction, using the PIN, by the certificate access and PIN manager, to enable a cryptography session handler to operate the private key to sign the request to validate the certificate; and
using, by the client service in conjunction with the user device, the private key to sign a response to a request from the server to validate the certificate.

2. The method of claim 1, further comprising:
displaying, by the client service, the list of certificates by using the public interface to instruct the certificate access and PIN manager to use the PIN to identify the certificates from a protected storage, to generate the list of certificates from the identified certificates, and to provide the list of certificates to the client service.

3. The method of claim 1, wherein the public interface includes an application program interface.

4. The method of claim 1, wherein the authentication process is part of a two-way transport layer security (TLS) handshake, and wherein selecting the certificate is performed before starting the TLS handshake.

5. The method of claim 1, wherein unlocking the private key and using the private key to sign the response is performed in a background process of the user device.

6. A non-transitory computer-readable medium having instructions stored thereon, which in response to execution by one or more processors, cause the one or more processors to perform a method for an authentication process between a user device and a server for a virtual desktop infrastructure (VDI) provided by a virtualized computing environment, wherein the method comprises:
  storing, on the user device, a certificate and a corresponding private key used to authenticate the user device to the server, wherein the certificate and private key are pre-installed in an operating system of the user device, and wherein at least one of the certificate or the private key is protected by a passcode, wherein the passcode comprises a personal identification number (PIN) that is unknown to a user of the user device;
  selecting, by a client service for the VDI, the certificate from amongst a list of certificates that are pre-installed in the user device and that are valid for the server;
  sending, by the client service, the certificate to the server in response to a request from the server for the certificate;
  unlocking, by the client service, the private key using a public interface, wherein unlocking the private key using the public interface bypasses entry of the passcode by the user, and wherein unlocking includes:
    sending, by the client service via the public interface, an instruction to a certificate access and PIN manager to unlock the private key; and
    in response to the instruction, using the PIN, by the certificate access and PIN manager to enable a cryptography session handler to operate the private key to sign the request to validate the certificate; and
  using, by the client service in conjunction with the user device, the private key to sign a response to a request from the server to validate the certificate.

7. The non-transitory computer-readable medium of claim 6, wherein the method further comprises:
displaying, by the client service, the list of certificates by using the public interface to instruct the certificate access and PIN manager to use the PIN to identify the certificates from a protected storage, to generate the list of certificates from the identified certificates, and to provide the list of certificates to the client service.

8. The non-transitory computer-readable medium of claim 6, wherein the public interface includes an application program interface.

9. The non-transitory computer-readable medium of claim 6, wherein the authentication process is part of a two-way transport layer security (TLS) handshake, and wherein selecting the certificate is performed before starting the TLS handshake.

10. The non-transitory computer-readable medium of claim 6, wherein unlocking the private key and using the private key to sign the response is performed in a background process of the user device.

11. A computing device, comprising:
  a processor, and
  a non-transitory computer-readable medium coupled to the processor and having instructions stored thereon, which in response to execution by one or more processors, cause the one or more processors to perform an authentication process between the computing device and a server for a virtual desktop infrastructure (VDI) provided by a virtualized computing environment, wherein the instructions cause the processor to:
  store, on the computing device, a certificate and a corresponding private key used to authenticate the computing device to the server, wherein the certificate and private key are pre-installed in an operating system of the computing device, and wherein at least one of the certificate or the private key is protected by a passcode, wherein the passcode comprises a personal identification number (PIN) that is unknown to a user of the computing device;
  select, by a client service for the VDI, the certificate from amongst a list of certificates that are pre-installed in the computing device and that are valid for the server;
  send, by the client service, the certificate to the server in response to a request from the server for the certificate;
  unlock, by the client service, the private key using a public interface, wherein unlocking the private key using the public interface bypasses entry of the passcode by the user, and wherein unlocking includes:
    sending, by the client service via the public interface, an instruction to a certificate access and PIN manager to unlock the private key; and
    in response to the instruction, using the PIN, by the certificate access and PIN manager to enable a cryptography session handler to operate the private key to sign the request to validate the certificate; and
  use, by the client service in conjunction with the computing device, the private key to sign a response to a request from the server to validate the certificate.

12. The computing device of claim 11, wherein the instructions further cause the processor to:
display, by the client service, the list of certificates by using the public interface to instruct the certificate access and PIN manager to use the PIN to identify the certificates from a protected storage, to generate the list of certificates from the identified certificates, and to provide the list of certificates to the client service.

13. The computing device of claim 11, wherein the public interface includes an application program interface.

14. The computing device of claim 11, wherein the authentication process is part of a two-way transport layer security (TLS) handshake, and wherein selection of the certificate is performed before starting the TLS handshake.

15. The computing device of claim 11, wherein the unlock of the private key and the use of the private key to sign the response are performed in a background process of the computing device.

\* \* \* \* \*